Figure 1:
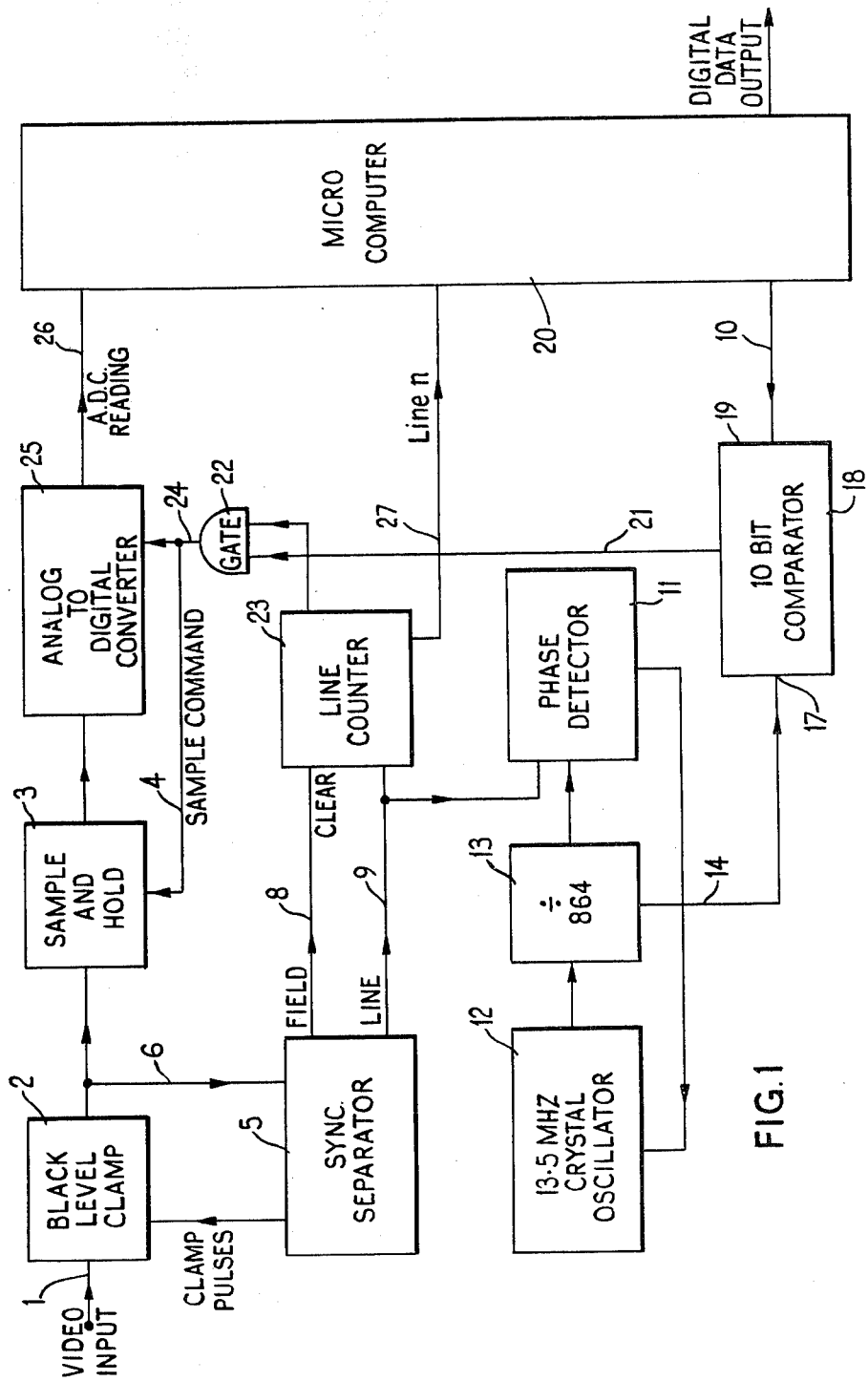

United States Patent [19]

Schaffer et al.

[11] 4,215,367
[45] Jul. 29, 1980

[54] TELEVISION SYSTEMS

[75] Inventors: Jeffrey Schaffer, London; John E. Moore, Harrow, both of England

[73] Assignee: Independent Broadcasting Authority, London, England

[21] Appl. No.: 626,453

[22] Filed: Oct. 28, 1975

[30] Foreign Application Priority Data

Nov. 1, 1974 [GB] United Kingdom ............... 47330/74

[51] Int. Cl.² ............................................... H04N 7/02
[52] U.S. Cl. ........................................ 358/139; 358/10
[58] Field of Search .......................... 358/139, 140, 10

[56] References Cited

U.S. PATENT DOCUMENTS

| 3,792,195 | 2/1974 | Wilson | 358/139 |
| 3,989,891 | 11/1976 | Freestone | 358/139 |

OTHER PUBLICATIONS

Ing. P. D'Amato, Intermodulation Distortion Measurement, May 11, 1970, pp. 199-207.

Primary Examiner—Robert L. Griffin
Assistant Examiner—Edward L. Coles
Attorney, Agent, or Firm—A. W. Breiner

[57] ABSTRACT

Apparatus for deriving a television quality parameter from an insertion test signal line which is repeated at regular intervals during field blanking periods of a television signal comprises a sampling system operable, when actuated, to provide a digital amplitude signal representing the instantaneous amplitude of the test line, controllable actuating means for actuating the sampling system, a computer programed (a) to calculate the quality parameter from a plurality of digital amplitude signals, corresponding with different sampling positions on the test line, and provided by the sampling system, (b) to provide the calculated quality parameter as output, (c) to respond to timing origins carried by the television signal and control the actuating means at times, so related to the timing origins, that the signals of said plurality of signals are provided in turn, at a low average rate, e.g. each from a different occurrence of the test line.

A relatively cheap analog to digital converter may be employed.

9 Claims, 5 Drawing Figures

TELEVISION SYSTEMS

SPECIFICATION OF THE INVENTION

The present invention relates to television systems.

In order that the quality of a television signal may be monitored it has become customary to add one or more insertion test signals to the television signal. Such a test signal occupies one of the line periods which occurs during the field blanking periods of the signal and is not therefore displayed on ordinary receivers. It is repeated at regular intervals, usually on every occurrence of the chosen line period. With a 625 line interlaced system of 25 fields of odd lines per second alternating with 25 fields of even lines per second, the test signal is repeated 25 times per second, and the line period available for the signal is 64 microseconds. Two or more insertion test signals may be added to the same television signal, each on its own line period.

The form of the test signal is such that analysis thereof can yield quality parameters useful in determining the behaviour of, and over a period of time changes in the behaviour of, a television system as a whole, or of parts of a system, for example, communication links or transmitters, including un-manned transmitters. The quality parameters are calculated from measurements of the test signal. They may show behaviour directly or they may require to be used in further calculation to show behaviour. The term "quality parameter" as used herein is to be interpreted accordingly.

To make best use of the signal, accurate analysis is required. For this purpose it has been proposed to use automatic apparatus which avoids the requirement for a skilled technician to make repeated measurements. An object of the present invention is to provide such apparatus in a new and improved form.

In accordance with the present invention, there is provided an apparatus for deriving a television quality parameter from an insertion test signal line which is repeated at regular intervals during field blanking periods of a television signal which comprises a sampling system operable, when actuated, to provide a digital amplitude signal representing the instantaneous amplitude of the test line, controllable actuating means for actuating the sampling system, and a computer programmed (a) to calculate the quality parameter from a plurality of digital amplitude signals, corresponding with different sampling positions on the test line and provided by the sampling system (b) to provide the calculated quality parameter as output (c) to respond to timing origins carried by the television signal and control the actuating means at times, so related to the timing origins, that the signals of said plurality of signals are provided in turn at a low average rate, e.g. each from a different occurrence of the test line.

Further in accordance with the present invention, there is provided a method of deriving an output representing a television quality parameter from an insertion test signal line which is repeated at regular intervals during field blanking periods of a television signal, which comprises deriving a plurality of digital amplitude signals, each of which represents the instantaneous amplitude of the test line at a different sampling position thereon, at times so related to timing origins carried by the television signal that the different signals of said plurality are derived at a low average rate, e.g. during different occurrences of the test line, and feeding the digital amplitude signals to a computer programmed to calculate the quality parameter, to provide said parameter as output, and to respond to timing origins carried by the signal to provide requests related to said timing origins in a manner corresponding with the sampling positions on said occurrences of the test line, said plurality of digital amplitude signals being provided in response to said requests.

The timing origins referred to may be any readily determinable repeated features of the television signal. In the present state of the art it is convenient to use the line sync pulses as timing origins. We believe however that improved results would be obtainable by treating a feature of the test signal itself as a timing origin, for example the leading edge of the white bar in the form of a high rectangular pulse which is usually the first significant event of the test signal. It is to be understood that although the apparatus and method described in detail hereinafter use the line sync pulses as timing origins, we do not intend to be taken as limited to this arrangement.

In a preferred form of the apparatus, the sampling system is a sample and hold device followed by an analog to digital converter. It is a feature of the invention that the instantaneous amplitude of the signal is taken at intervals of such length, such as on different occurrences of the test line, that an analog to digital converter provided in this arrangement is not required to operate at high frequency. It may therefore be a converter of economic construction, much simpler and cheaper than, for example, the kind of converter required for digitising the whole of the picture information in a standards converter as described in British Pat. Specification No. 1,362,191 or U.S. Pat. No. 3,742,135. No problem arises in storing the digitised information for the requisite period in the memory of the computer.

A plurality of samples may be taken during a single occurrence of a test line whilst retaining some of the advantages of the invention, provided that the average rate of sampling is kept low. For example, samples taken at short intervals on a single occurrence of a test line may be sampled, and stored in analog form, and digitised by a simple analog to digital converter at times within the capability thereof. However, for most quality parameters sampling on different occurrences of the test line is adequate and the complication of providing analog stores is not justified.

Advantage may be taken of the numerical mode of operation of the computer in the arrangement of the actuating means. Thus the apparatus may have a generator operable to provide a number of output signals at least during the occurrence of the insertion test signal lines so that each output signal represents a sampling position on a line, and a comparator responsive to the number of such output signals generated, and to a timing count number provided by the computer and representing a required position on the line, to actuate the sampling system.

Where the invention is to be applied to a television signal having a color sub-carrier, the sampling times related to the timing origins are conveniently interrelated such that differences between the times give samples which are conveniently related to the phase of the sub-carrier.

Figure 2:
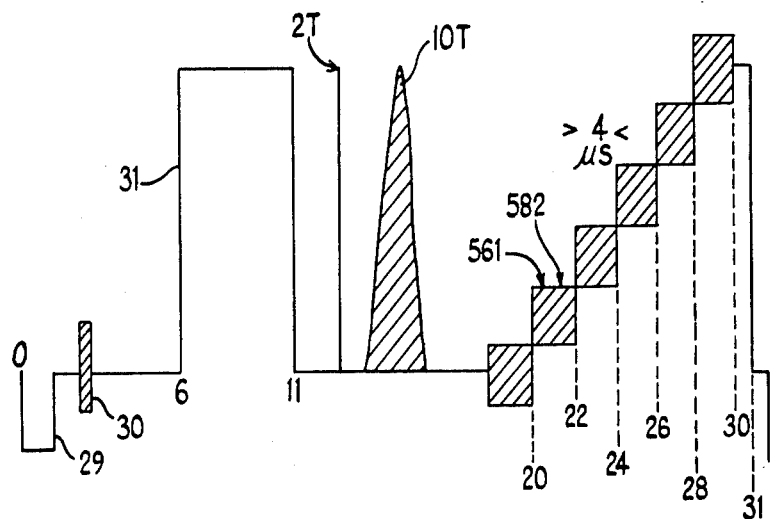
Figure 5:
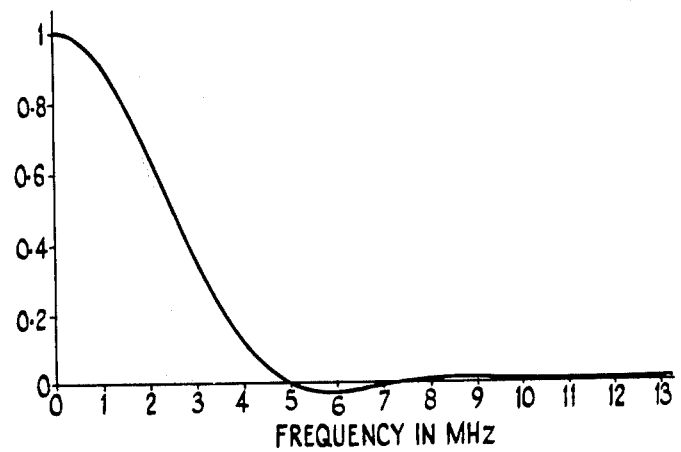
Figure 3:
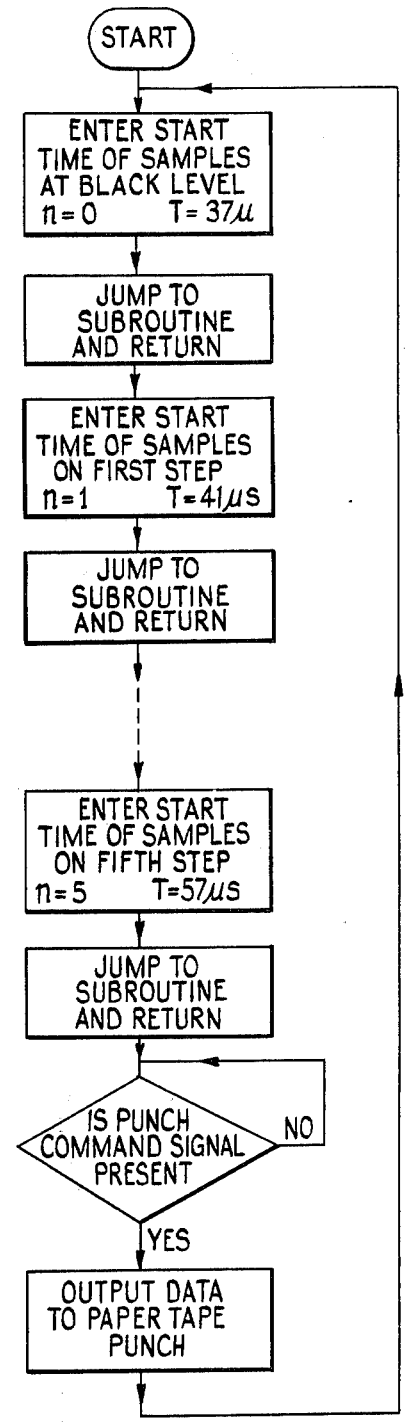
Figure 4:
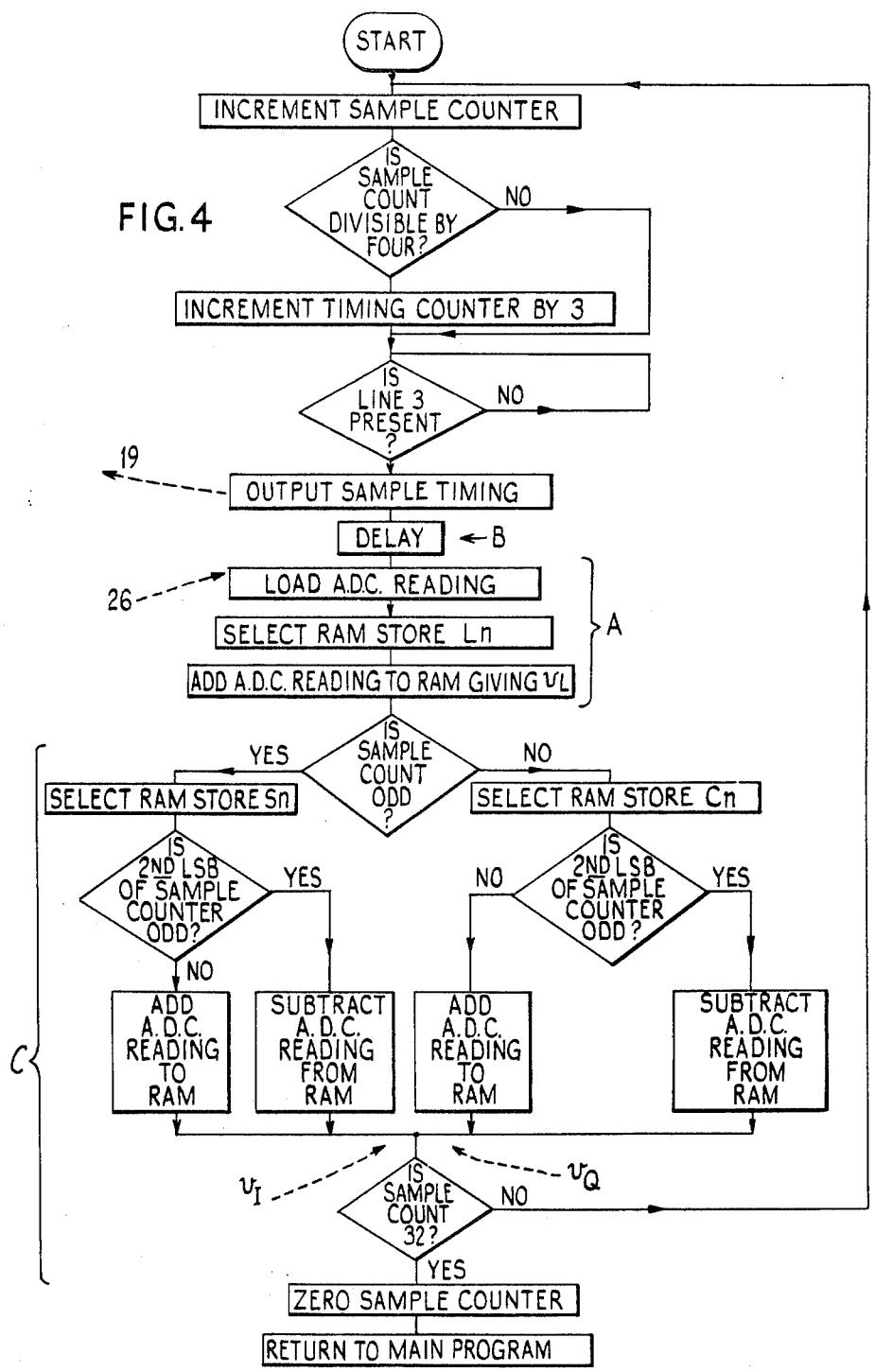

The following description in which reference is made to the accompanying drawings is given in order to illustrate the invention. In the drawings:

FIG. 1 is a diagrammatic drawing showing an example of an apparatus as provided by the invention, FIG. 2 shows an example of an insertion test line, FIG. 3 shows the main programme of the microcomputer provided in the apparatus of FIG. 1, FIG. 4 shows a sub-routine used by the main programme of FIG. 3, and FIG. 5 shows the spectrum of the 2T pulse provided on the test line of FIG. 2.

The apparatus of FIG. 1 has an input 1 for 625 line interlaced television signals of 25 frames (50 fields) per second received by cable or off the air via a demodulator. The signal is clamped by a black level clamp 2 and applied to a sample and hold circuit 3. Circuit 3, when actuated briefly by a sample command signal on line 4 provides an analog signal corresponding with the instantaneous amplitude, above black level, of the received signal. This analog signal is in the form of a voltage on a capacitor.

A sync separator 5 fed from the clamped signal on line 6 provides clamp pulses on line 7, field pulses on line 8, and line pulses on line 9. The line pulses on line 9 are fed to a phase detector 11 in a phase locked loop wherein the received line frequency controls a 13.5 MHz crystal oscillator 12. A divide-by-864 device 13 in the loop divides the 13.5 MHz frequency to line frequency (i.e. $625 \times 25 = 15625$ Hz $= 13.5$ MHz/864).

The divide-by-864 device 13 also operates to count the cycles of the oscillator 12 and provide a numerical output count of 10 bits on highway 14. The output count on highway 14, whose values represent a series of 864 positions along the active line time of the received signals, is applied to one input 17 of a 10 bit comparator 18. A second 10 bit input 19 to comparator 18 on highway 10 receives a timing count from a micro computer 20.

When the two counts received by comparator 18 coincide a signal is provided on line 21 and applied to a gate 22, responsive also to a line counter 23. Line counter 23 counts line pulses on line 9 and is cleared by field pulses on line 8. The output 24 of gate 22 provides the sample command on line 4 to actuate the sample and hold 3 and also an analog to digital converter 25 which provides an eight bit digital output representing the instantaneous magnitude of the signal, when sampled, which is passed to the computer 20 on 8 bit highway 26.

Counter 23 also passed a signal to the computer 20 on line 27 when a television line of interest, shown as line n, is present.

Thus digitised amplitude signals, and a signal indicating when line 3 of the signal is present are passed to the computer, and the computer provides a timing count at 19 as well as an output of digital data at 28.

The choice of computer and the programming thereof depend upon the parameter or parameters to be determined, and of course upon the form of test line involved. The following Examples are given by way of illustration.

EXAMPLE 1

In this Example, the test line is as shown in FIG. 2 and is provided on line 19 of the signal. Following the line sync pulse 29 is a burst of colour sub-carrier 30, a white bar 31 a 2T pulse a 10T pulse and a staircase 32. Each step of the staircase has a duration of 4 microseconds and has a superimposed colour burst. When the colour burst at black level immediately before the staircase is included (33 in FIG. 2) there are timing values 6, 8, 11 ... 31 shown in FIG. 1 in units of 2 microseconds, and the duration of the signal, from the leading edge of the sync pulse is 64 microseconds.

Samples are taken nominally during the middle third of each step. Thus on the 20 to 22 step samples are taken at count 561 of the divide-by-864 and then at intervals of three counts up to and including count 582. Counts 561 and 582 are indicated in FIG. 2. There are eight sampling positions and four samples are taken at each, at four successive occurrences of the test line. Because there is a finite delay before the sample and hold circuit 3 provides an output, the sample is not precisely upon the middle third of each step. This point is not of practical importance.

The computer employed is a commercially available micro computer (Intel MCS-4 manufactured by Intel Corporation, California, U.S.A.) comprising a single chip 4 bit central processing unit, four read only memories (ROM's), four random access memories (RAM's) and about 30 TTL packages used for control purposes. The ROM's have a total capacity of 1024 program steps and the total RAM capacity is 1280 bits. The complete computer is mounted upon a single card of about $9 \times 5$ inches in size. Access is by 16 data input lines and 32 output lines.

The functioning of the computer is best explained by reference to FIGS. 3 and 4. FIG. 3 shows the main program of the computer and FIG. 4 shows a sub-routine thereof. By sampling instantaneous amplitude values of the signal at the black level immediately before the staircase and then on the remaining five steps, data is obtained from which useful parameters, including linearity, can be derived. In accordance with the invention, a single amplitude value is taken for each occurrence of line 3.

By the main program, the start times of the sampling at the black level and on the five further steps of the staircase are entered into the sub-routine of FIG. 3 from the program memory of the computer in turn. When a start time is entered the sub-routine of FIG. 3 is followed to effect sampling on the staircase level immediately following. Four samples are taken at each of the eight sampling points on each step. After the sampling of the staircase has been completed, and data calculated therefrom, the results are output in digital form for recording permanently by a paper tape punch of conventional design.

When a start signal actuates the sub-routine, a sample counter is incremented by one value at a time. Every time the sample count is divisible by four (i.e. when four samples have been taken at a sampling point), a timing counter is incremented by three. For every sample, a check is made for the presence of line 3 of the television signal (which necessarily occurs on the odd fields containing line 19), and a sample timing count is provided for presentation to the input 19 of comparator 18 (FIG. 1). This timing count is the start time entered by the program memory incremented by the timing counter. The timing count reaches the comparator 18 well before the occurrence of line 19. When line 19 arrives, the presence of equal count numbers at inputs 17 and 19 of comparator 18 and a line 19 count at gate 22 provides a sample command on line 4 to actuate the sample and hold 3. The clamped video input is sampled, digitised in converter 25, received by the computer and added to one of three random access memory stores—see A in FIG. 4. A delay phase of the sub-routine (see B in FIG. 4) is provided to allow converter 25 to operate.

Since the timing counter is incremented in steps of three for application to the input 19 of comparator 18, the effect is to advance the timing of the sampling by circuit 3 by three cycles of the 13.5 MHz oscillator (when the sample count is a multiple of four). The frequency of the oscillator is slightly greater than the third harmonic of the 4.43 MHz colour sub-carrier. Consequently the sampling positions are separated by intervals slightly less than intervals corresponding with cycles of the sub-carrier.

Samples taken and stored as just described are processed by an arithmetic part C of the sub routine. The sample counter is incremented until the sample count is 32 and then returned to zero.

The instantaneous amplitude $v$ of the test line at time $t$ is given by the equation $$v = v_L + v_c \sin(2\pi ft + \phi) \quad (1)$$

where
$f$ is the colour sub-carrier frequency,
$v_L$ is the luminance amplitude,
$v_c$ is the sub-carrier amplitude, and
$\phi$ is an arbitrary phase angle.

With the PAL system, the phase of the sub-carrier on line 3, or any other line of the television signal, changes from frame to frame in multiples of 90°, e.g. 0°, 270°, 180°, 90°, 0° repeating. From equation (1) it follows that the amplitudes on four consecutive samples $v_n \ldots v_{n+3}$, taken all on odd or all on even, fields are $$v_n = v_L + v_c \sin B \quad (2)$$

$$v_{n+1} = v_L - v_c \cos B \quad (3)$$

$$v_{n+2} = v_L - v_c \sin B, \text{ and} \quad (4)$$

$$v_{n+3} = v_L + v_c \cos B \quad (5)$$

where $B = 2\pi ft + \phi$ from which $$v_I = v_n - v_{n+2} = 2v_c \sin B \quad (6)$$

$$v_Q = v_{n+3} - v_{n+1} = 2v_c \cos B, \text{ and} \quad (7)$$

$$v_r = v_n + v_{n+1} + v_{n+2} + v_{n+3} = 4v_2 \quad (8)$$

These values are derived by the arithmetic part C

In the arithmetic part C, the digitised amplitudes $v_c$ taken on odd sample counts, e.g. on fields n and n+2, and the even sample counts, e.g. on fields n+1 and n+3 are routed separately. The odd-counts cause the value $v_c \sin B$ to be selected from a random access memory. When the second least significant bit (LSB) of the (binary) sample counter is odd—this occurs for alternate ones of the odd sample counts—the digitised amplitude value from the converter 25 is subtracted from the value $v_c \sin B$. When the second LSB is even, the digitised value is added. The even counts cause a similar operation. Here, the digitised value is added to $v_c \cos B$ when the second LSB is even and subtracted therefrom when the second LSB is odd.

The result is to produce one luminance component value $v_L$, and two colour component values, $v_I$ and $v_Q$ derived as in equations (6), (7) and (8) above for the paper tape punch. These three values are readily communicated using a transmitter actuated by the tape over a circuit of small bandwidth, e.g. a normal telephone circuit. By having the apparatus which is reasonably simple and cheap, involving as it does an economic analog to digital converter 25 and a micro computer 20 of small size and low rate of operations, it is feasible to install the apparatus at remote sites and pass the results to a central station for further processing to provide performance data for action by expert staff watching the performance of equipment at several sites.

With some further complexity, the punched paper tape can be processed at the site, or the data shown herein as going to the paper tape punch can be fed instead direct to further computer equipment at the site. In this way it is possible to provide fully processed quality information in visual form for the assistance of a technician making on-site adjustments to the equipment. A more elaborate computer, giving results which require no further processing, may be provided within the apparatus itself in place of the micro-computer 20.

EXAMPLE 2

FIG. 5 shows the spectrum of the 2T pulse of FIG. 2. Only very little energy is present beyond 5 MHz. Having regard to the general rule that a signal can be reconstituted without loss from samples taken at a rate of twice the bandwidth, the 2T pulse requires a sampling interval of not more than 100 nanoseconds. By the application of the present invention, the sampling is effected on successive occurrences of the test line. Thus with a test line occurring only on odd fields of a 50 field/sec. system the required sampling period becomes not more than $0.04 + 10^{-7}$ second which is well within the scope of economic apparatus.

EXAMPLE 3

For the measurements of the white bar 31 of FIG. 2 to determine amplitude and tilt, three instantaneous amplitudes are taken viz. one at the black level after the burst 30 of colour sub-carrier and two spaced apart at the nominally white level of the bar. Using the present method the amplitudes are taken at intervals of more than 0.04 seconds.

it is to be noted that an analog to digital converter giving an 8 bit output (256 possible values) is adequate for present purposes. The possible error in the digitised value is ±0.5 value. With the staircase shown in FIG. 2, each riser corresponds with about 44 values of the converter output. An error of 0.5 value is of significance but not of primary importance. It is in any case reduced by averaging over four, or a multiple of four fields, as in Example 1.

It will be understood that the foregoing description of specific embodiments of the invention is given for purposes of illustration only and that various departures may be made therefrom within the ambit of the invention. For example, arrangements may be provided for the automatic comparison of one or more quality parameters with a standard to provide a fault signal which serves to actuate a warning device and/or to control apparatus, e.g. apparatus for re-routing the signal to avoid a defective channel.

We claim:

1. Apparatus for deriving a television quality parameter from an insertion test signal line inserted into a television signal which is repeated at regular intervals during field blanking periods of the television signal, said apparatus comprising means for receiving a test signal line inserted into a television signal; a sampling system which, when actuated, provides a digital amplitude signal representing the instantaneous amplitude at a sampling position of the received test line, controllable actuating means for actuating the sampling system and a computer having means for (a) calculating the quality parameter from a plurality of digital amplitude signals, corresponding with instantaneous amplitudes at different sampling positions on the test line, and provided by the sampling system, (b) providing the calculated quality parameter as output, and (c) responding to timing origins carried by the television signal and control the actuating means at times, so related to the timing origins that the signals of said plurality of signals are provided in turn, at a low average rate, and means for providing a readout of said derived television quality parameter.

2. Apparatus according to claim 1 in which the sampling system is a sample and hold device followed by an analog to digital converter.

3. Apparatus according to claim 1 in which the timing origins are sync pulses.

4. Apparatus according to claim 1 having a generator operable to provide a number of output signals at least during the occurrence of the insertion test signal lines so that each output signal represents a sampling position on a line, and a comparator responsive to the number of such output signals generated, and to a timing count number provided by the computer and representing a required position on the line, to actuate the sampling system.

5. Apparatus according to claim 1 in which the computer includes means for controlling the actuating means so that instantaneous amplitude signals are provided from different occurrences of the test line and means for calculating the quality parameter from the instantaneous amplitude signals so provided.

6. A method of deriving an output representing a television quality parameter from an insertion test signal line inserted into a television signal which is repeated at regular intervals during field blanking periods of a television signal, said method comprising the steps of (1) deriving a plurality of digital amplitude signals, each of which represents the instantaneous amplitude of the test line at a different sampling position thereon at times so related to timing origins carried by the television signal in order that the signals of said plurality are derived from a plurality of the test lines, (2) feeding the digital amplitude signals obtained in step (1) to a computer having means for (a) calculating the television quality parameter, (b) providing said parameter as output, and (c) responding to timing origins carried by the signal being fed to provide requests related to said timing origins in a manner corresponding with the sampling positions on said occurrences of the test line, said plurality of digital amplitude signals being provided in response to said requests, and (3) obtaining a readout of said television quality parameter.

7. A method according to claim 6 in which the timing origins are line sync pulses of the signal.

8. A method according to claim 6 in which the television signal has a colour sub-carrier and the times related to the timing origins are interrelated such that differences between the times given samples related to the phase of the sub-carrier.

9. A method according to claim 6 in which the television signal has a color sub-carrier of the PAL type and the times related to the timing origins are interrelated such that the differences between the times are a multiple of the period of the third harmonic of the color sub-carrier.

* * * * *